(12) United States Patent
Eidenschink et al.

(10) Patent No.: US 10,972,286 B2
(45) Date of Patent: Apr. 6, 2021

(54) TOKEN-BASED AUTHENTICATION WITH SIGNED MESSAGE

(71) Applicant: BITAGENTUR GMBH & CO. KG, Munich (DE)

(72) Inventors: Maximilian Eidenschink, Munich (DE); Marcel Senf, Munich (DE)

(73) Assignee: BITAGENTUR GMBH & CO. KG, Munich (DE)

( * ) Notice: Subject to any disclaimer, the term of this patent is extended or adjusted under 35 U.S.C. 154(b) by 267 days.

(21) Appl. No.: 16/319,128

(22) PCT Filed: Jul. 18, 2017

(86) PCT No.: PCT/EP2017/068161
§ 371 (c)(1),
(2) Date: Jan. 18, 2019

(87) PCT Pub. No.: WO2018/015402
PCT Pub. Date: Jan. 25, 2018

(65) Prior Publication Data
US 2019/0280876 A1 Sep. 12, 2019

(30) Foreign Application Priority Data

Jul. 18, 2016 (DE) .......................... 102016213104.4

(51) Int. Cl.
*H04L 29/06* (2006.01)
*H04L 9/32* (2006.01)
(52) U.S. Cl.
CPC .......... *H04L 9/3247* (2013.01); *H04L 9/3213* (2013.01); *H04L 63/0853* (2013.01); *H04L 63/123* (2013.01)
(58) Field of Classification Search
CPC . H04L 9/3247; H04L 9/3213; H04L 63/0853; H04L 63/123
See application file for complete search history.

(56) References Cited

U.S. PATENT DOCUMENTS

| 8,370,952 B1 | 2/2013 | Wieder | |
| 2002/0023215 A1* | 2/2002 | Wang | G06Q 20/00 713/171 |

(Continued)

FOREIGN PATENT DOCUMENTS

| AT | 13 290 U1 | 10/2013 |
| JP | 2012-138650 A | 7/2012 |

(Continued)

OTHER PUBLICATIONS

Menezes, et al., "Chapter 1: Overview of Cryptography Ed," Handbook of Applied Cryptography, CRC Press Series on Discrete Mathematics and Its Applications, CRC Press, 1996, pp. 1-48.

(Continued)

*Primary Examiner* — Ghodrat Jamshidi
(74) *Attorney, Agent, or Firm* — Seed IP Law Group LLP (57) ABSTRACT

The invention relates to a method (50) for authenticating a user to a computer system (70), the method comprising the following steps executed in a token (10): generating (52) a counter value (20, 22) by utilizing a counting unit (12) implemented in the token (10), wherein at least a portion of generated counter values (20, 22) forms a strictly monotonous sequence, generating (54) a message (30) depending on the generated counter value (20, 22), signing (56) the generated message (30) by utilizing a private key (24) of the user, wherein the private key (24) is stored in the token (10), and wherein the private key (24) or a copy thereof is not provided to the computer system (70), and transmitting (58) the signed message to the computer system (70). The invention further relates to a token (10) for authenticating a user to a computer system (70) and to a method (60) executed on a computer system (70) for authenticating a user. The token (10A, 10B) according to the invention may be implemented in hardware or software in a mobile device (80A, 80B). The invention further relates to a computer (Continued)

program product comprising instructions which, when executed on a processor (72, 82), implement the steps of the inventive methods.

19 Claims, 2 Drawing Sheets

(56) References Cited

U.S. PATENT DOCUMENTS

| | | | | |
|---|---|---|---|---|
| 2010/0049984 A1* | 2/2010 | Masushio | ............. | H04L 9/0861 713/179 |
| 2012/0214443 A1* | 8/2012 | Daigle | ............... | G06Q 20/3829 455/411 |
| 2013/0119130 A1* | 5/2013 | Braams | ............. | G06Q 20/4012 235/382 |
| 2015/0269633 A1* | 9/2015 | Mahadevan | ....... | G06Q 30/0269 705/71 |
| 2015/0304313 A1* | 10/2015 | Lu | ........................ | H04L 63/0838 726/9 |
| 2016/0134599 A1* | 5/2016 | Ross | ........................ | G06F 21/41 713/168 |
| 2017/0161486 A1* | 6/2017 | Jeon | ........................ | H04L 63/083 |
| 2017/0163629 A1* | 6/2017 | Law | .................... | H04L 63/0823 |
| 2018/0131688 A1* | 5/2018 | Fang | ..................... | G06F 21/128 |

FOREIGN PATENT DOCUMENTS

| | | |
|---|---|---|
| WO | 2007/122224 A1 | 11/2007 |
| WO | 2011/110402 A1 | 9/2011 |

OTHER PUBLICATIONS

Menezes, et al., "Chapter 11: Digital Signatures Ed," Handbook of Applied Cryptography, CRC Press Series on Discrete Mathematics and Its Applications, CRC Press, 1996, pp. 425-488.

* cited by examiner

TOKEN-BASED AUTHENTICATION WITH SIGNED MESSAGE

FIELD OF THE INVENTION

The present invention generally relates to the field of securing computer systems, and more particularly to authenticating users to computer systems.

BACKGROUND OF THE INVENTION

Authorizing users to access applications and data on computer systems requires verification of the user's identity. Only after successful verification of the claimed identity should access to applications and data be granted.

A common practice for verifying the alleged identity of a user is to query static passwords. This procedure has the disadvantage that the user has to make a password entry that is error-prone and is annoying for the user. Also, the static password query has the disadvantage that a secure password usually needs to be noted down and that the password can be recorded by unauthorized persons. If, on the other hand, a simple password is chosen, this can be easily guessed and therefore determined in a sufficiently short period of time, for example by means of probing ("brute force attack").

US 2010/0049984 A1 discloses a method for authenticating a user of a mobile telephone to a server. The mobile phone contains an integrated circuit in which a user identification is stored. User identification and current time are signed by means of a signature key and transmitted to the server. The server verifies the validity of the signature with the same signature key, thus serving as a common key for users and servers.

From JP 2012-138650 A a method for time-based authentication of a data stream is known. Hash data generated by an electronic signature is generated from the data stream.

From U.S. Pat. No. 8,370,952 B1 a token is known in which the ownership of the token is anonymized by encryption with a private key performed by an identity provider. A service provider with the corresponding public key is able to conclude a valid identity without being able to decrypt it.

WO 2007/122224 A1 discloses a USB token (Universal Serial Bus), which logs on to the computer system as an input device (human interface device, HID) and is able to issue keystrokes at the push of a button. This allows the input device to transmit predefined keystrokes, such as a password in plain text or encrypted to the computer system, by means of a symmetric method.

This USB token has the disadvantage that an individual integration of a plurality of applications requires either the use of the same password or a specific selection made by the user, which password stored in the USB token is to be transmitted to the respective application if the USB token is able to store multiple passwords.

In addition, the transmission of secrets such as passwords in general poses a security risk. Challenge-response methods reduce the associated risks by not transmitting a secret (shared secret) for authorization, but rather by placing a challenge on the authenticating body. Based on the response of the user to be authorized, the authenticating body can recognize that he knows the secret.

In order to protect the messages to be transmitted accordingly, a Public Key Infrastructure (PKI) can be used. Each user of a public key infrastructure is assigned both a public and a private key. This key pair can be associated with a certificate issued by a trusted certification authority that binds the respective public and private key to an associated user.

To ensure security, it must be ensured that the private key of a user remains secret and is only available to the authorized user to whom this key is assigned to generate a signature or to decrypt messages. Often, smart cards or USB tokens are used to store the private and public keys and the certificate, and perform the cryptographic calculations associated with the private key.

The use of such smart cards and USB tokens has the disadvantage that specific adaptations of the authentication routines of the applications are required because instead of communication with conventional input devices, messages must be sent to a smart card. The smartcard signs the received message and sends the signed message to the application for review.

OBJECTS AND SUMMARY OF THE INVENTION

It is an object of the invention to enable the authentication of users in a form that on one hand provides a high level of security and on the other hand, involves the least possible adaptation effort in existing applications.

The present invention is based on the concept that, for secure authentication of a user, no shared information between the user and the authenticator is required, which must be kept secret. It is essential for the invention (i) to sign a message with a specific set-up, (ii) to verify the validity of the signature in an asymmetric cryptographic scheme, and (iii) to recognize a repeated verification of an already received message within a reasonable time interval based on the specific structure of the message.

The advantage of the invention is that no secret is required on the authentication side. All data required for authentication may be public knowledge.

According to a first aspect of the invention, a method is provided for authenticating a user to a computer system, the method comprising the following steps performed in a token:
  generating a counter value by utilizing a counting unit implemented in the token, wherein at least a portion of generated counter values forms a strictly monotonous sequence,
  generating a message depending on the generated counter value,
  signing the generated message by utilizing a private key of the user, wherein the private key is stored in the token, and wherein the private key or a copy thereof is not provided to the computer system (70), and
  transmitting the signed message to the computer system.

Preferably, the token is arranged such that the private key stored in the token cannot be read from resources outside the token.

In a preferred embodiment of the invention, the token is set up to log on to the computer system as an input device (Human Interface Device). The transmission of the signed message may include the encoding and transmission of the signed message as input data, in particular as keyboard input data (for example by means of keyboard scan codes).

The message can be generated depending on one or more additional counter values. A counter value may be a numeric counter value, for example an integer, which is incremented when the counting unit is polled again. However, other types of counter values are also contemplated. Thus, a time indication, for example, including the date as a time stamp, may be provided. The date contained in the time indication may be coded according to a conventional calendar, for example the Gregorian calendar. A numerical representation of the date may also be provided, for example in seconds since an initial date.

In a preferred embodiment of the invention, the counting unit comprises a clock. The counter value may include a timestamp. In this case, the counter value coded in the message can be based on the time stamp or can be present in addition to a numerical counter value, for example.

Basically, counter values may be represented by any content which can be identified by a renewed query of the counting unit as subsequently generated counter value against a previously generated counter value. This rule must at least apply to a sufficiently large portion of consecutively generated counter values. In this respect, a strict monotony of a portion of generated counter values of the same type applies.

The term "portion" includes a certain number of counter values generated immediately after each other, which together form a portion of counter values. The boundary condition of a strict monotony to be applied to at least a portion of counter values results from a limitation of the counter values during storage and processing.

After a certain number of generated counter values, the counter value will reach an upper threshold, which occurs before an overflow of the counter. At the latest in this case, the counter will have to continue at the next counting with a counter value corresponding to a lower threshold. For safety reasons, the width of the counter will be correspondingly large. In a preferred embodiment, the counter comprises 32 bits and can therefore distinguish about 4 billion counter values.

The width of the counter is selected to be sufficiently large if a potential attacker would have to spend a high amount of time in order to be able to reuse an intercepted message with a specific counter value because so many queries have taken place in the meantime that the intercepted message must again be regarded as subsequent.

In a preferred embodiment of the invention, the message is further generated depending on an identification feature of the token. The identification feature allows the receiving computer system to identify the user associated with the token. This information is required to identify the associated public key needed to verify the signature of the received message. As long as the associated public key can also be determined otherwise, a transmission of the identification feature in the signed message is not mandatory. The user may make a selection of the user as part of the authentication process on the computer system, for example, by manually entering his user name (login) via the keyboard.

The message can also be generated depending on a protocol version. Extracting the protocol version from a received message allows the use of different formats for the generated message because the receiving computer system can process the message differently depending on the coded protocol version.

The message can also be generated depending on a flag. The flag can be used to indicate problems upon creating the signed message. Preferably, the flag indicates a failure of a power supply in the token. The flag thus indicates the state that an optionally existing real-time clock in the token could not generate a correct timestamp because the real-time clock has either been reset to a start value or stopped during the failure of the power supply. Alternatively or additionally, the flag may signal a pending counter overrun so that the receiving computer system may subsequently interpret a counter value corresponding to a lower threshold than the upper threshold.

The message can also be generated depending on a user-defined prefix. The user-defined prefix is preferably used for grouping tokens, for example for identifying departments of a company. The user-defined prefix can also be used to distinguish different tokens of the user, for example to distinguish the user's roles (private token, business token).

Depending on the supported maximum length of a message, additional contents may be incorporated into the message that are available on the computer system for further processing.

Preferably, the message to be signed comprises a minimum length of 32 bytes, which are coded as ASCII characters, for example. If the message to be signed is shorter than the minimum length, it can be padded with padding bytes according to a defined padding rule. The padding bytes can be removed again after the signature has been generated.

Preferably, the message to be signed without padding bytes has a length of 23 bytes, which is increased by means of padding bytes to 32 bytes. If the padding bytes are removed from the signed message prior to transmitting the message, the padding rule must be made known to the authenticating computer system so that the untransmitted padding bytes are added back to the signed message to be verified for proper verification of the signature. The padding bytes may be single ASCII characters located at defined locations in the message to be signed. The signature preferably comprises 64 characters of one byte each and is appended to the message. The signed message thus comprises 87 bytes, thereof 23 bytes for the message after the removal of the padding bytes and 64 bytes for the signature of the message extended to 32 bytes.

In a preferred embodiment, the signed message is encoded according to Base64 or a comparable format such that the length of the message increases in the ratio 4/3, for example, from 87 bytes to 116 bytes. In Microsoft Corporation's Windows series operating systems, the limit for entering passwords is 127 bytes. In this respect, it is possible to read the received message into a password input field.

In one embodiment, the token includes means for retrieving a security feature, such as a keyboard for a password query. The message is also generated in this embodiment depending on the requested password. Alternatively, the password is transmitted together with the signed message. In a preferred embodiment, 8 bytes are reserved for the transmission of a password together with or in the signed message.

Base64 encoding has the advantage that there are no special characters in the message when transmitting the Base64 encoded and signed message. The Base64 encoding is based on the use of 64 ASCII characters, including the 26 lowercase and uppercase letters of the alphabet (a-z, A-Z), the digits 0-9 and the ASCII characters plus ("+") and slash ("/"). In a preferred embodiment, a Base64 derivative having the ASCII characters comma (",") and semicolon (";") is used instead of plus ("+") and slash ("/").

In a preferred embodiment of the invention, the transmitted and optionally encoded message is sent via Universal Serial Bus (USB), Bluetooth or Near Field Communication (NFC). Preferably, the signed and optionally encoded message is sent as simulated keyboard input to the computer system by means of the token that is registered as a Human Interface Device on the computer system and that is recognized as USB or Bluetooth keyboard, for example. The transmission of the signed and optionally encoded message can be done via keyboard scan codes. A keyboard scan code represents the encoding of a keystroke on a keyboard, which is assigned an ASCII code in the computer system.

The ASCII characters of the Base64 encoded message are preferably transmitted in the encoding of the respective associated keyboard scan codes. It should be noted that the assignment between ASCII characters and keyboard scan codes depends on the language configuration of the computer system. Although a large number of keyboard scan codes are independent of the set language, however, there are individual ASCII characters represented by different keyboard scan codes depending on the given language of the present keyboard.

A first example of this behavior is the keyboard scancode of the "z" key on an English keyboard, which is interpreted as "y" on a German keyboard. A second example is the keyboard scan code of the "z" key on an English keyboard, which is interpreted as "w" on a French keyboard. In addition, the key ";" on a French keyboard is swapped with the key "," on a German keyboard. On a Cyrillic keyboard, almost all English keyboard scancodes correspond to specific Cyrillic characters with a different ASCII code. In this respect, it is possible to deduce the set language configuration by generating keyboard scancodes of two different previously agreed ASCII characters involving a linguistic difference and retrieving the ASCII code generated by the computer system.

In a preferred embodiment, the signed and optionally encoded message is provided with a verification code. The verification code comprises the keyboard scan codes of at least two previously agreed ASCII characters that are suitable for distinguishing different language configurations. Preferably, the verification code of the message is prefixed. As a verification code, for example, one of the following pairs of characters chosen from a predefined language: on a German keyboard "y" and "," can be used for distinguishing, which correspond to keys "z" and ";" on an English keyboard. In some embodiments, the verification code is included as an attribute in the message to be signed.

In case of Base64 encoding, the available "alphabet" of the message consists of 64 characters, which are preferably represented by keyboard scan codes. In some embodiments, the 64 characters of Base64 encoding are represented by the keyboard scan codes of the 26 letters of the alphabet (a-z), the digits 0-9, the shift key, and the keyboard scancode of the comma (","). As the shift key affects the alphabet and the comma character, the characters A-Z and semicolon (=shift key plus comma on the German keyboard) or the "less than" character (=shift key plus comma on the English keyboard) can be displayed in combination with the shift key so that a total of 64 characters can be displayed. If the token and the computer system use the same language configuration, the computer system can convert the keyboard scan codes of the received message into a signed message encoded as ASCII characters by applying the mapping from keyboard scan codes to ASCII characters resulting from the identified language configuration.

According to a second aspect of the invention, there is provided a token for authenticating a user to a computer system, the token comprising a counting unit for generating a counter value, wherein at least a portion of generated counter values forms a strictly monotonous sequence, a memory for storing a private key associated with the user, a processing unit for generating a message depending on the generated counter value and for signing the generated message by utilizing the private key, and a transmitting unit for transmitting the signed message to the computer system, wherein the token is adapted to perform the method according to the first aspect of the invention. The private key does not need to be made accessible to the computer system to authenticate the user.

The token may be integrated into dedicated hardware ("hardware tokens") both as a stand-alone electronic device or as part of a more comprehensive electronic device.

The components of a token implemented in hardware may communicate with each other via a bus system, for example via an I$^2$C bus.

The memory may include a security chip that stores the user's private key. Preferably, the private key does not leave the security chip by providing a function on the security chip to sign a message. The security chip may include an interface for reading and storing a private key. Preferably, the security chip has a function for generating a private key and the associated public key and a function for reading the public key.

The counting unit may comprise one or more components for counting, wherein each individual component may be, for example, a hardware counter or a real-time clock (RTC).

In a preferred embodiment, the hardware counter provides an integer on request that has been incremented from the previous request. If the hardware counter reaches an upper threshold, for example immediately before a counter overflow, the hardware counter can resume at a lower threshold. Reaching the upper threshold or continuing at the lower threshold may be communicated to the computer system in the message. The computer system may be informed of the structure of the counter value and thus know that, when reaching the upper threshold, the lower threshold will follow.

Preferably, the real-time clock is a clock that operates in the token independently of external time signals. The real-time clock can have temperature compensation to increase accuracy. The real time clock can also be a GPS receiver capable of extracting the time from GPS signals. The real time clock may be a radio clock receiver, such as DCF77. The real-time clock may also be a unit for receiving the time of the computer system with which the token is associated in an authentication process. The real-time clock may further be a unit for communicating over the Internet, the time being obtained from one or more time servers.

The processing unit may comprise one or more components for calculating, each individual component being a central processing unit (CPU), a microcontroller (MCU), an arithmetic logic unit (ALU), or a parallel logic unit (PLU). Thus, a separate component of the processing unit may be responsible for signing the message and one or more different components may be responsible for generating one or more counter values.

The transmitting unit comprises one or more components for transmitting the message to the computer system, wherein each individual component may be implemented as a Universal Serial Bus (USB), Bluetooth, or Near Field Communication (NFC) interface. Preferably, the token represents functionality as a keyboard to a computer system to be authenticated once the token is connected to a computer system via the transmitting unit. In addition to the operating mode "keyboard", the transmitting unit can also have other operating modes, for example for transmitting a key stored in the token. If the token transmits a separate security feature as part of a two-factor authentication, this security feature can be transmitted in a separate operating mode of the transmitting unit.

The term transmitting unit does not exclude that the transmitting unit can also receive data, for example, for acknowledgment to the computer system of successfully received data or data for the configuration of the token, for example the uploading of key pairs or receiving instructions for generating key pairs.

A token implemented in hardware may be implemented in several components with interfaces between the components of the token. The token preferably comprises a radio interface, for example Bluetooth and/or near field communication (NFC). An add-on module can extend the token with another interface, for example an interface according to the Universal Serial Bus (USB).

Preferably, the Universal Serial Bus (USB) interface has a microcontroller that logs on the token to a computer system as a USB keyboard as soon as the token is connected to the computer system via the USB interface.

A hardware-implemented token may have an internal power supply, which is particularly advantageous for tokens having only one or more radio interfaces for communicating with the computer system. An internal power supply may be advantageous even for tokens with wired interfaces that allow an external power supply, especially if a real-time clock of the token needs to be supplied. The internal power supply may be, for example, an accumulator, a battery or a solar cell. A token may have an interface to an external power supply.

In case of a token implemented in software, said components like counting unit, memory, processing unit, and transmitting unit can be substituted by corresponding components of the device on which the token software is implemented. The transmitting unit may comprise a software interface to the operating system or application programs of the device to authenticate the user to the device on which the software token is installed.

In a preferred embodiment of the invention, the token comprises a first control element for initiating an authentication process. The first control element may be a button operated by the user to effect the generation and transmission of the signed message. In case of a device registered as a Human Interface Device, the token appears to the computer system like a keyboard that generates simulated keystrokes representing the signed message upon pressing the first control element.

In a preferred embodiment of the invention, the memory contains a public key associated with the private key. The public key is not needed in the token to generate the signed message. However, the public key must be accessible to any computer system to which the token is attached to authenticate the user. In this respect, it is advantageous to deposit the public key in the token so that it can be imported into a computer system on request.

In a preferred embodiment of the invention, the token comprises a second control element for initiating a transmission of the public key to the computer system. The second control element may be a button. The public key can be transmitted via keyboard scan codes. The token can additionally be designed as a USB data carrier on which the public key can be deposited for transfer to computer systems.

According to a third aspect of the invention, a method is provided for authenticating a user, the method comprising the following steps performed in a computer system:

receiving a signed message from a token, the signed message being dependent on a counter value of the token according to the second aspect of the invention, assigning the user to the signed message by utilizing an identification feature, verifying the signature of the signed message using a public key of the user, and comparing the counter value extracted from the message with the counter value of a previous authentication process of the user, wherein at least a portion of counter values of consecutive authentication processes of the user forms a strictly monotonous sequence.

According to a preferred embodiment, the token is connected to the computer system as a human interface device. The token may transmit the signed message as simulated keyboard input encoded in keyboard scan codes. Preferably, the received message is preceded by a verification code or the verification code is integrated into the signed message. The verification code comprises the keyboard scan codes of at least two previously agreed ASCII characters that are suitable for distinguishing different language configurations. As there is an agreement between the token and the computer system about the ASCII characters to be submitted in the verification code, the computer system can determine which language configuration corresponds to the received keyboard scan codes and assign the keyboard scan codes to the respectively assigned ASCII characters. The received message can now—if it has been encoded by the token— decoded according to Base64.

To verify the signature, the appropriate public key must be identified. For this purpose, it is necessary to assign the received message to a user in order to determine the associated public key from the determined user. Thus, it is not necessary for the user and computer system to share a secret feature, such as the user's private key, to authenticate the user. The user can be determined from an identifier in the signed message. The user can also be identified by other associations, for example, by entering a user name (login) via a keyboard on the computer system, while the password input is initiated by the token. As a result, it is not absolutely necessary to integrate an identification feature in the message.

If the message to be signed has been expanded to a minimum length by padding bytes and the padding bytes have been removed prior to transmission of the signed message, the computer system supplements the untransmitted padding bytes according to a corresponding padding rule before verifying the signature of the received message.

In some embodiments, in addition to the signed message of the token, another security feature may be verified, for example, by entering a password via a keyboard of the computer system or the token (two-factor authentication). Only if the entered password and the verification of the signed message of the token are positive, access is granted to the computer system or to an application of the computer system.

Verifying the token involves verifying the signature and verifying the strict monotony of the counter value contained in the message or the counter values included in the message. Depending on the security requirements and on the synchronization of different computer systems using the token for user authentication, the strict monotony verification may further comprise verifying that the verified counter value is to represent the increment of the most recently verified counter value without a gap.

In other embodiments, gaps between the current counter value and the last verified counter value may be permissible, in particular when the user authentication token is used on a plurality of computer systems that do not synchronize or do not sufficiently often synchronize the most recently verified counter value. In this case, however, unauthorized persons could tamper with the message on a first computer system in order to import the intercepted message to a second computer system, which has not yet been informed of the authentication process on the first computer system. In order to prevent an incorrect positive result of a token verification, synchronization of the verified counter values between the computer systems can be made.

Alternatively or additionally, a time stamp or a comparable attribute can be included in the message, which ensures a short validity period of the message. For this purpose, a time stamp contained in the message can be used, which allows use of the received message only within a defined period of time.

If both the verification of the signature, the verification of all counter values, including a timestamp have been positive, the authentication of the user is successful. This prevents intercepted messages from being played successfully on other, non-synchronized computer systems.

The authentication process according to the invention can be implemented with little adaptation effort in existing authentication modules.

For example, the authentication process of the invention may be hung on existing hooks of an LDAP authentication module to process the received password data according to the third aspect of this invention. Thus, the authentication process according to the invention can be implemented in a dynamic library called by the LDAP authentication module. From the point of view of the operating system and the application programs, therefore, standard-compliant LDAP authentication is still assumed.

An integration of the inventive authentication in operating systems of the Windows series is possible via a programming interface, for example via the Windows Credential Management API. The integration of the authentication according to the invention preferably takes place via the open source software pGina, which has an extensible plug-in architecture and uses the programming interface of the Windows Credential Management API. The authentication according to the invention can be implemented in an LDAP server which is connected to the Windows Credential Management API via pGina. The LDAP server preferably stores a static password assigned to the user, which is passed to the Windows Credential Management API for verification purposes. Alternatively, the static password can be stored in the token and transmitted to the computer system. A static password is required on Windows-series operating systems because Windows uses the password of the user to encrypt user data.

The computer system on which the authentication is performed may also include other electronic devices for which authentication is relevant. Thus, the computer system may also include a terminal for access control and/or time recording and an electronic door lock.

Authentication on the computer system can be used for local access control, for example under operating systems such as Windows, Mac OS X, Linux and Unix. Authentication on the computer system can be used for directory logon, for example under Windows Active Directory, SMB and CIFS. In addition, authentication to the computer system may provide access control to application programs, services, web applications, and VPN.

According to a fourth aspect of the invention, there is provided a mobile device comprising a hardware-implemented token, the hardware-implemented token comprising a token according to the second aspect of the invention.

According to a fifth aspect of the invention, there is provided a mobile device comprising a software-implemented token, the software-implemented token having instructions that, when executed on a processor of the mobile device, implement the steps of the method of the first aspect of the invention.

According to a sixth aspect of the invention there is provided a computer program product comprising instructions which, when executed on a processor, implement the steps of the method of the first aspect or the third aspect of the invention.

The invention may include a setup and maintenance program that transfers an existing private key and optionally an associated public key to the token. Preferably, the setup and maintenance program has a function for generating a key pair consisting of a private key and a corresponding public key or a function that prompts the token for generating the key pair. The setup and maintenance program may be used to set and/or read a time for a real-time clock of the token, for example to set the time for the first time or to set the time after a power failure, which has led to a standstill or reset of a real-time clock of the token. The setup and maintenance program may have a function for setting and/or reading the user-defined prefix. The setup and maintenance program may include a function for setting and/or reading counter values.

BRIEF DESCRIPTION OF THE DRAWINGS

Further features, objects and advantages of the invention will become apparent from the following detailed description taken in conjunction with the accompanying schematic drawings, in which.

DETAILED DESCRIPTION OF EXEMPLARY EMBODIMENTS OF THE INVENTION

The invention is used to authenticate users in a computer system. The invention is preferably used for logging in users to an operating system. The invention can also be used for authentication in application programs or web applications, for example in social networks. The invention is suitable for verifying the identity of the user assigned to the token. The token may be integrated into dedicated hardware ("hardware tokens") both as a stand-alone electronic device or as part of a more comprehensive electronic device. The token is also suitable for implementation in software ("software tokens") for use in a mobile, portable computer such as a computer, a tablet computer, a smartphone, a netbook, a notebook, or a laptop when it comes to accessing a computer system, specific application programs, or data using the mobile device. The software token can also be used for authentication on the mobile device in which the software token is installed. The preferred use as a hardware token is only to be seen as a possible field of application.

In the following embodiments, the invention is implemented as an isolated hardware token that allows a user to log on to the operating system of a computer system. However, the embodiments are not limited thereto; in an analogous manner, each embodiment and its disclosed features of the invention apply to all fields of application.

The individual embodiments highlight in most cases only individual features of the invention. This illustration is for the clarity and better understanding of the invention.

Those features of the invention that are independent of other features of the invention may be arbitrarily combined as desired.

Figure 1:
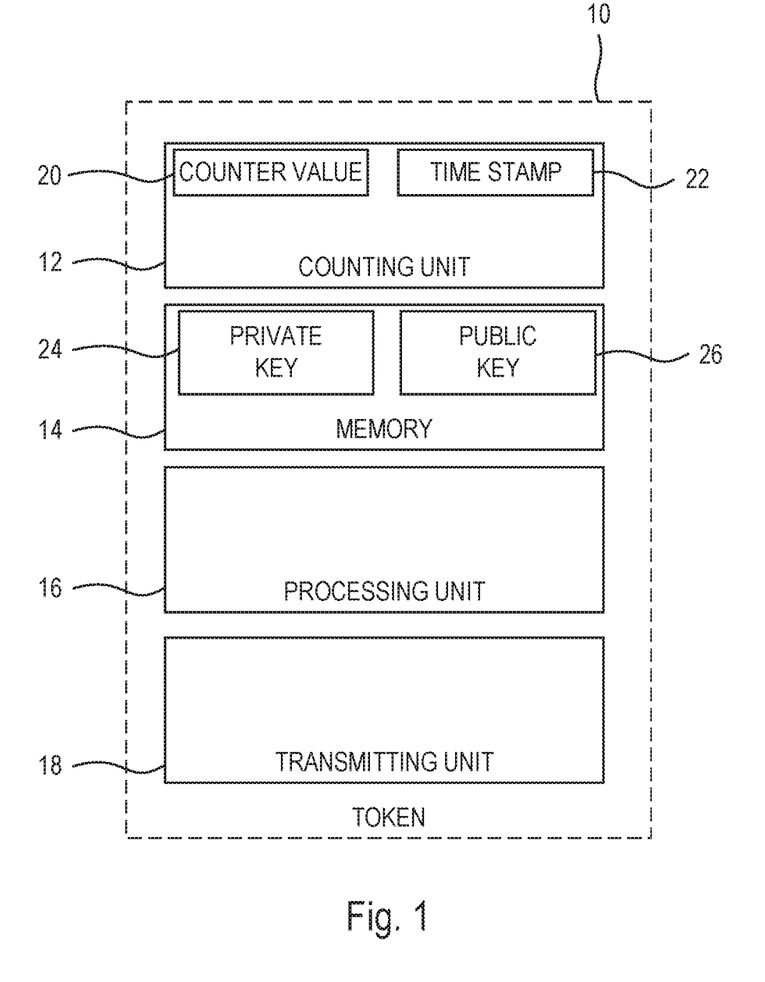
FIG. 1 shows a schematic representation of a token according to an embodiment of the invention.

FIG. 1 shows the schematic structure of a token 10 which comprises a counting unit 12, a memory 14, a processing unit 16 and a transmitting unit 18. The counting unit 12 is used to generate one or more counter values 20, 22. For example, a numerical counter value 20 and/or a time stamp 22 may be used as counter values 20, 22. The memory 14 stores a private key 24 associated with the user of the token 10. The private key 24 does not need to be made accessible to the computer system to authenticate the user. The memory 14 may further include a public key 26 associated with the private key 24. Only the public key 26 or a copy thereof must be made accessible to the computer system for authentication. The processing unit 16 is configured to generate a message 30 by causing the counting unit 12 to generate at least one counter value 20, 22. The at least one generated counter value 20, 22 serves as the basis for generating the message 30 using the at least one generated counter value 20, 22. A generated counter value 20, 22 is characterized in that the counter value 20, 22 with each generation of a new counter value 20, 22 against a previously generated counter value 20, 22 can be identified as subsequently generated counter value. This condition must at least apply to the counter values of a series with a minimum number of counter values within the series. There is no restriction on numerical values; any content may be provided as a counter value 20, 22, as long as the generated content can be identified within a sufficiently large defined series of content as subsequently generated content compared to the previously generated content. In some embodiments, the term "subsequently" may be understood as immediately subsequently, while in other embodiments a certain number of counter values 20, 22 may be between the currently generated and an previous counter value 20, 22. The processing unit 30 is further configured to sign the generated message 30 with the private key 24. The signed message may be appropriately encoded according to the requirements of the transmission path and the receiving computer system before the transmitting unit 18 transmits the signed and optionally encoded message to a computer system 70. The computer system 70 receives the signed and optionally encoded message to authenticate the user based on the signed message.

Figure 2:
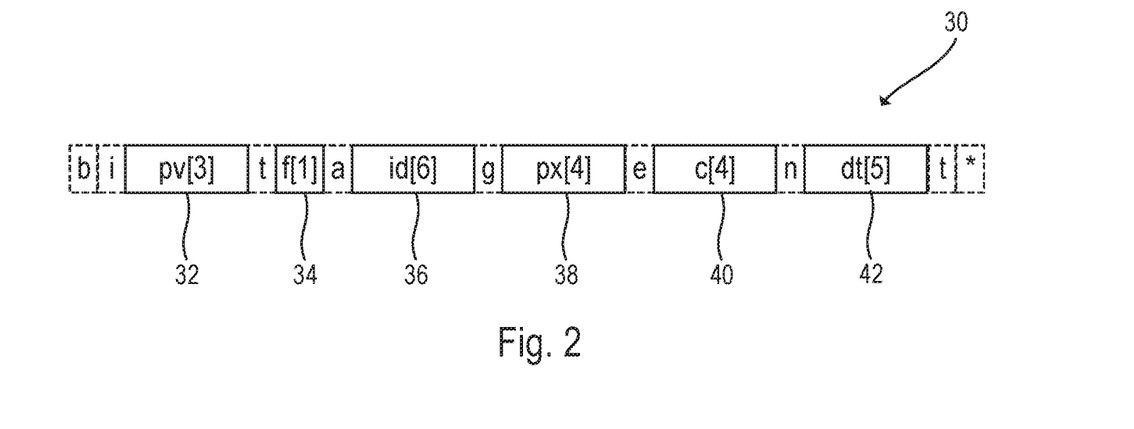
FIG. 2 shows a schematic representation of a message signed by a token according to an embodiment of the invention.

FIG. 2 shows the structure of a message 30 to be signed according to an embodiment of the invention. The message 30 may preferably comprise 32 characters belonging to one or more character encodings, for example, ASCII with one byte per character. The message 30 is generated from one or more attributes which, for example, are arranged next to one another and optionally separated from one another by separators. The example message 30 is composed of the following six attributes:

The first attribute 32 represents a protocol version of the message 30 so that the receiving computer system 70 is able to distinguish the structure of the message 30 from messages 30 of other protocol versions. The protocol version 32 can be encoded, for example, in 3 bytes.

The second attribute 34 represents a flag that signals problem instances in generating the message, such as a power failure in the token, such that a real-time clock in the token for generating a time stamp has stopped or has been reset to a start value. The flag 34 may be encoded, for example, in 1 byte.

The third attribute 36 represents an identification feature of the token 10 so that the token can be assigned to a user. The identification feature 36 of the token 10 can be encoded, for example, in 6 bytes.

The fourth attribute 38 represents a user-defined prefix, for example, to group tokens by departments of a company or to associate multiple tokens with a user. The user-defined prefix 38 may be encoded in 4 bytes, for example.

The fifth attribute 40 represents a first coded counter value. The first coded counter value 40 corresponds to a counter value 20, 22 generated by the counter 12 or is calculated based on the generated counter value 20, 22. The first coded counter value 40 may be a numeric counter value 20, for example, encoded in 4 bytes.

The sixth attribute 42 represents a second coded counter value. The second coded counter value 42 corresponds to a counter value 20, 22 generated by the counter 12 or is calculated based on the generated counter value 20, 22. The second coded counter value 42 may be a time stamp 22 and encoded in 5 bytes, for example.

The message 30 may also be generated based on one or more of the six attributes, for example, by juxtaposing one or more of the six attributes in any order.

In a preferred embodiment, further components are included in the message 30 to ensure a minimum length of the message to be signed, such as the ASCII representatives of the string "bitagent *" (without the quotation marks), the attributes being inserted between any two adjacent characters of the previously generated message 30. The generated message 30 can now be signed. The inserted additional components can be removed from the message again after the signature has been generated, so that they are contained in the message only for generating and later verifying the signature, but not during the transmission of the message.

Figure 3:
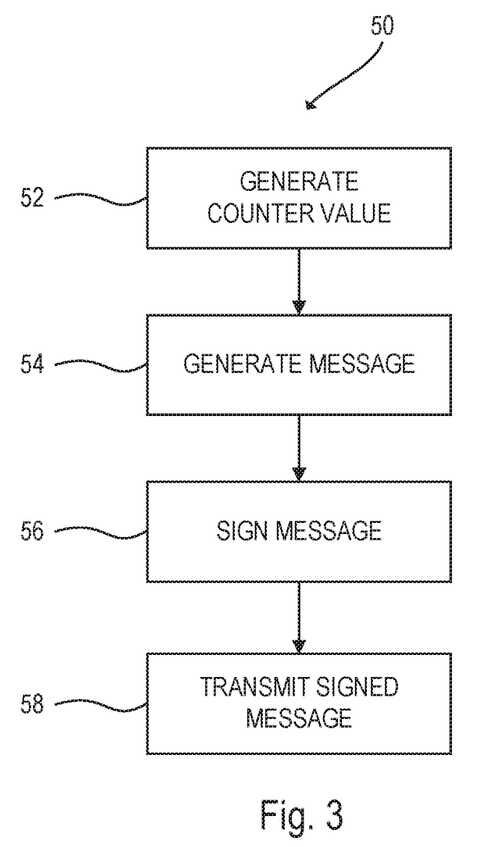
FIG. 3 shows a method for authenticating a user to a computer system according to an embodiment of the invention.

FIG. 3 shows the method 50 for authenticating a user to a computer system 70. The method steps are performed in a token 10.

In a first method step 52, a counting unit 12 implemented in the token 10 generates at least one counter value 20, 22. A generated counter value 20, 22 is characterized in that the at least one counter value 20, 22 with each generation of a new counter value 20, 22 with respect to one previously generated counter value 20, 22 can be identified as subsequently generated counter value. In this respect, at least a portion of generated counter values 20, 22 forms a strictly monotonous sequence.

In a second method step 54, a message 30 is generated as a function of the at least one generated counter value 20, 22. For this purpose, the at least one counter value 20, 22 can be transformed into an associated coded counter value 40, 42. More attributes and fixed components may be added to the message 30.

In a third method step 56, the generated message 30 is signed using a private key 24 of the user assigned to the token 10. The private key 24 may be stored in the token 10.

The signed message may be encoded depending on the computer system 70 receiving the message and the chosen transmission path.

In a fourth method step 58, the signed and optionally encoded message is sent to the computer system 70 for authentication of the user.

Figure 4:
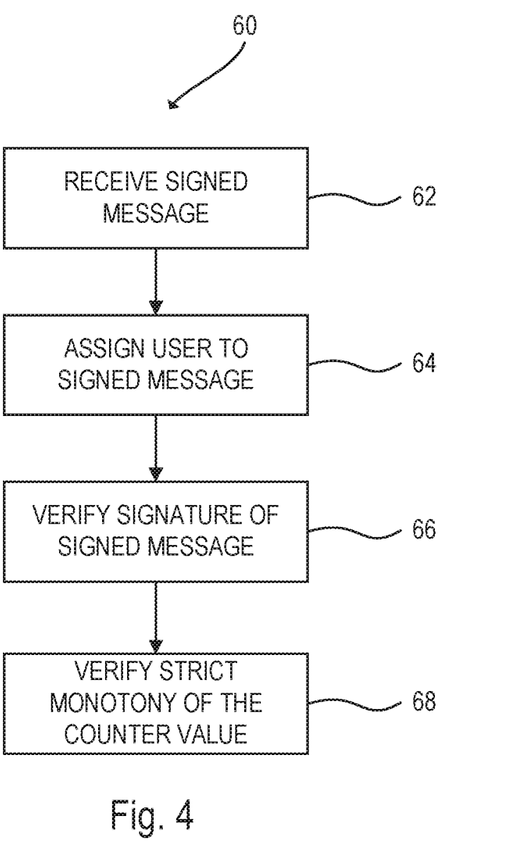
FIG. 4 shows a method for authenticating a user to a computer system according to an embodiment of the invention.

FIG. 4 shows a method 60 for authenticating a user to a computer system 70.

In a first method step 62, the computer system 70 receives a signed and optionally encoded message from a token 10 of the user.

In a second method step 64, the computer system 70 determines to which user the signed message can be assigned. For this purpose, a suitable identification feature 36 is verified. The identification feature 36 is preferably encoded as an attribute in the received message. The identification feature 36 can also be provided via other input channels, for example by manual data input via a keyboard or by the selection of a user. The user may be derived from an identification feature 36 by using a mapping table.

In a third method step 66, the computer system 70 determines the public key 26 of the user who is associated with the identified identification feature 36. After the received message has been signed using the private key 24 associated with the user, the computer system 70 is able to verify the authenticity of the received message with the determined public key 26.

In order to protect the authentication process from the repeated import of an intercepted signed message, the strict monotony of the at least one counter value 20, 22 contained in the message is verified in a fourth method step 68. For this purpose, the at least one counter value 20, 22 contained in the received message is extracted from the message and compared with the respectively assigned previous counter value 20, 22 of a preceding authentication process 60 of the user. In this case, the one or more newly received counter values must each be identified as subsequent values in comparison to the preceding authentication process 60. In some exemplary embodiments, it is verified that one or more of the received counter values are immediately subsequently following or that the distance between the respectively newly received counter value and the associated previously received counter value is below a limit value. Alternatively or additionally, a period of validity of the message can also be verified, for example on the basis of a time stamp 22 contained in the message.

Figure 5:
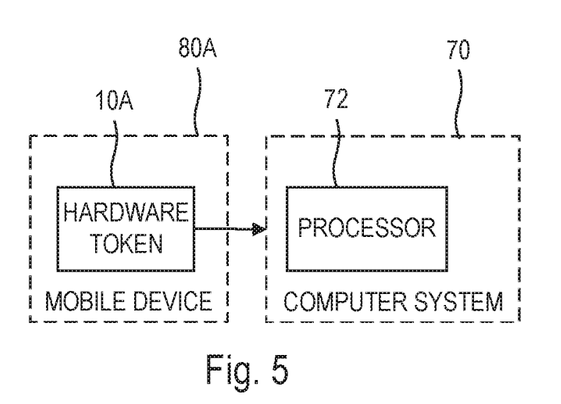
FIG. 5 shows a schematic representation of a mobile device with a hardware token according to an embodiment of the invention.

The token can be designed as a hardware token that represents an electronic device. FIG. 5 shows a mobile device 80A in which a token according to the invention is integrated as a hardware token 10A. The mobile device 80A may be specifically designed for the functionality of a token and equipped with an interface for communicating with a computer system. The mobile device may also be a mobile computer, for example a tablet computer, netbook, notebook or a smartphone, optionally with interfaces to a second or more devices. The definition of a hardware token 10A does not preclude that it comprises a processor on which instructions for realizing the functionality of the token are executed, and in so far the functionality of the hardware token is also effected by software. Decisive for the classification as a hardware token is the fact that the software runs within the closed system of the hardware token.

Figure 6:
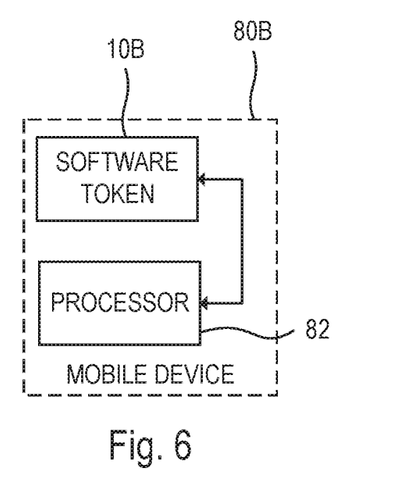
FIG. 6 shows a schematic representation of a mobile device with a software token according to an embodiment of the invention.

The token may also be implemented as a software token for execution on a processor of an electronic device. FIG. 6 shows a mobile device 80B in which a token according to the invention is integrated as a software token 10B. The software token 10B may be integrated as an application program ("App"), in middleware, or in the operating system of the mobile device 80B. The software token includes instructions that are executed on at least one processor 82 of the mobile device 80B.

The delineation of the software token 10B to the software of a hardware token 10A is given by sharing the resources for executing the token software with the remaining applications and services of the mobile device 80B while the software of the hardware token 10A is exclusively running on resources of the hardware token 10A which are isolated from the remaining resources of the mobile device 80A.

Incidentally, the invention includes all the components mentioned in the exemplary embodiments which are required for the realization of a hardware or software token. The task distribution between the individual components of the token described in the preceding exemplary embodiments is to be understood as an example. There are also other divisions between the components of the token conceivable that realize the described features of the invention in an equivalent form.

The details contained in the above description of embodiments should not be construed as limiting the scope of the invention but rather represent an exemplification of some of its embodiments. Many variants are possible and immediately apparent to the skilled person. In particular, this relates to variations comprising a combination of features of the individual embodiments disclosed in the present specification. Therefore, the scope of the invention should be determined not by the illustrated embodiments, but by the appended claims and their legal equivalents.

The invention claimed is:

1. A method performed in a token to authenticate a user to a computer system, the method comprising:
   generating a counter value by utilizing a counting unit implemented in the token, wherein at least a portion of generated counter values forms a strictly monotonous sequence;
   generating a message depending on the generated counter value;
   signing the generated message to form a signed message by utilizing a private key of the user, wherein the private key is stored in the token, and wherein the private key or a copy of the private key is not provided to the computer system; and
   transmitting the signed message to the computer system, wherein the token is adapted to log on to the computer system as an input device, wherein transmitting the signed message includes encoding and transmitting the signed message as input data, wherein the input data is encoded as one or more keyboard scan codes of a defined language configuration, and wherein the generated message includes a verification code that includes at least two keyboard scan codes, the at least two keyboard scan codes representing, respectively, at least two previously agreed ASCII characters configured to distinguish different language configurations of the keyboard scan codes.

2. The method of claim 1, wherein the generated message to be signed has a minimum length of 32 bytes.

3. The method of claim 1, wherein the signed message comprises a maximum of 127 bytes.

4. The method of claim 1, wherein the signed message is encoded according to a format that increases a length of the signed message by a 4/3 ratio.

5. The method of claim 4, wherein the format is a Base64 format.

6. The method of claim 1, wherein the generated message includes padding bytes that are removed before transmitting the signed message.

7. The method of claim 1, wherein the generating a message further includes generating the message depending on an identification feature of the token.

8. The method of claim 1, wherein the counting unit includes a clock, and wherein the counter value includes a time stamp.

9. The method of claim 1, wherein the transmitting includes transmitting the signed message via Universal Serial Bus, Bluetooth, or Near Field Communication.

10. The method of claim 1, wherein the input device is a human input device.

11. The method of claim 1, wherein the verification code is included in the generated message before the generated message is signed.

12. A token to authenticate a user to a computer system, comprising:
- a counting unit configured to generate a plurality of counter values, wherein at least a portion of generated counter values forms a strictly monotonous sequence;
- a memory configured to store a private key associated with the user;
- a processing unit configured to:
  - generate a message, wherein the generated message is generated depending on a generated counter value;
  - form a signed message, wherein the signed message is formed by signing the generated message utilizing the private key; and
  - encode the signed message as input data, wherein the input data is encoded as one or more keyboard scan codes of a defined language configuration, and wherein the generated message includes a verification code that includes at least two keyboard scan codes, the at least two keyboard scan codes representing, respectively, at least two previously agreed ASCII characters configured to distinguish different language configurations of the keyboard scan codes; and
- a transmitting unit configured to transmit the signed message to the computer system, wherein the token is adapted to:
  - generate the generated counter value by utilizing the counting unit;
  - generate the message via the processing unit;
  - sign the generated message via the processing unit without providing the private key or a copy of the private key to the computer system; and
  - transmit the signed message to the computer system, wherein the token is adapted to log on to the computer system as an input device.

13. The token of claim 12, wherein the token further comprises:
- a first control element configured to initiate an authentication process.

14. The token of claim 12, wherein the memory comprises:
- a public key associated with the private key.

15. The token according to claim 14, wherein the token further comprises:
- a second control element configured to initiate a public key transmission to the computer system.

16. The token of claim 12, wherein the token is a hardware-implemented token.

17. A method to authenticate a user, the method comprising:
receiving in a computer system a signed message from a token, wherein the token includes:
- a counting unit configured to generate a plurality of counter values, wherein at least a portion of generated counter values forms a strictly monotonous sequence;
- a memory configured to store a private key associated with the user;
- a processing unit configured to:
  - generate a message, wherein the generated message is generated depending on a generated counter value;
  - form the signed message, wherein the signed message is formed by signing the generated message utilizing the private key; and
  - encode the signed message as input data, wherein the input data is encoded as one or more keyboard scan codes of a defined language configuration, and wherein the generated message includes a verification code that includes at least two keyboard scan codes, the at least two keyboard scan codes representing, respectively, at least two previously agreed ASCII characters configured to distinguish different language configurations of the keyboard scan codes; and
- a transmitting unit configured to transmit the signed message to the computer system, wherein the token is adapted to:
  - generate the generated counter value by utilizing the counting unit;
  - generate the message via the processing unit;
  - sign the generated message via the processing unit without providing the private key or a copy of the private key to the computer system; and
  - transmit the signed message to the computer system, wherein the token is adapted to log on to the computer system as an input device;
assigning in the computer system the user to the signed message via an identification feature;
verifying in the computer system a signature of the signed message by utilizing a public key of the user;
extracting in the computer system an extracted counter value from the received signed message; and
comparing the extracted counter value with a previous counter value of a previous authentication process of the user, wherein at least a portion of counter values of consecutive authentication processes of the user forms a second strictly monotonous sequence, wherein the computer system is adapted to support the token to log on to the computer system as an input device, wherein receiving the signed message includes decoding the signed message as the input data.

18. A mobile device comprising:
- a software-implemented token, wherein the software-implemented token includes instructions;
- a hardware counter that, when operating, is configured to generate counter values, wherein least a portion of generated counter values forms a strictly monotonous sequence;
- a processor that, when operating, is configured to execute the instructions to:
  - generate a counter value by utilizing the hardware counter;
  - generate a message depending on the generated counter value;
  - sign the generated message to form a signed message by utilizing a private key, wherein the private key is stored in the software-implemented token, and wherein the private key or a copy of the private key is not provided to a computer system;

encode the signed message as input data to form an encoded signed message, wherein the input data is encoded as one or more keyboard scan codes of a defined language configuration, and wherein the generated message includes a verification code that includes at least two keyboard scan codes, the at least two keyboard scan codes representing, respectively, at least two previously agreed ASCII characters configured to distinguish different language configurations of the keyboard scan codes; and a transmitting unit that, when operating, is configured to transmit the encoded signed message to the computer system, wherein the software-implemented token is adapted to log on to the computer system as an input device.

19. A computer program product stored on a non transitory computer readable medium comprising instructions that, when executed on a processor, cause the processor to:

generate a counter value by utilizing a counting unit implemented in a token, wherein at least a portion of generated counter values forms a strictly monotonous sequence;

generate a message depending on the generated counter value;

sign the generated message to form a signed message by utilizing a private key of a user, wherein the private key is stored in the token, and wherein the private key or a copy of the private key is not provided to a computer system; and transmit the signed message to the computer system, wherein the token is adapted to log on to the computer system as an input device, wherein transmitting the signed message includes encoding and transmitting the signed message as input data, wherein the input data is encoded as one or more keyboard scan codes of a defined language configuration, and wherein the generated message includes a verification code that includes at least two keyboard scan codes, the at least two keyboard scan codes representing, respectively, at least two previously agreed ASCII characters configured to distinguish different language configurations of the keyboard scan codes.

\* \* \* \* \*